United States Patent
McSheffrey

(10) Patent No.: US 6,758,097 B2
(45) Date of Patent: Jul. 6, 2004

(54) PRESSURE GAUGE SPRING

(75) Inventor: John J. McSheffrey, Hingham, MA (US)

(73) Assignee: MIJA Industries, Rockland, MA (US)

( * ) Notice: Subject to any disclaimer, the term of this patent is extended or adjusted under 35 U.S.C. 154(b) by 0 days.

(21) Appl. No.: 09/999,209

(22) Filed: Nov. 30, 2001

(65) Prior Publication Data

US 2003/0101823 A1 Jun. 5, 2003

(51) Int. Cl.$^7$ .............................................. G01L 7/04
(52) U.S. Cl. ........................... 73/732; 73/743; 73/741; 72/370.24
(58) Field of Search .................... 73/732, 738, 741, 73/743, 742, 419, 432

(56) References Cited

U.S. PATENT DOCUMENTS

| | | | |
|---|---|---|---|
| 1,714,988 A | 5/1929 | Schlaich | |
| 3,382,720 A | 5/1968 | Young | |
| 4,003,263 A | 1/1977 | O'Rourke | 73/432 |
| 4,006,639 A | 2/1977 | Wetterhorn | 73/393 |
| 4,023,416 A | 5/1977 | Ormsby | 73/419 |
| 4,034,612 A | 7/1977 | Buckwitz | 73/431 |
| 4,051,730 A | 10/1977 | Andrews et al. | 73/416 |
| 4,055,085 A | 10/1977 | Wetterhorn | 73/418 |
| 4,117,727 A | 10/1978 | Friswell et al. | 73/422 |
| 4,136,560 A | 1/1979 | Gellos | 73/146.8 |
| 4,176,558 A | 12/1979 | Wetterhorn | 73/741 |
| 4,184,375 A | 1/1980 | Gray | 73/706 |
| 4,191,056 A | 3/1980 | Holden | 73/743 |
| 4,246,778 A | 1/1981 | Fiala | 73/114 |
| 4,337,664 A | 7/1982 | Kipp et al. | 73/741 |
| 4,374,475 A | 2/1983 | Hestich | 73/736 |
| 4,501,152 A | 2/1985 | Wetterhorn et al. | 73/738 |
| 4,541,276 A | 9/1985 | Perkins | 73/296 |
| 4,567,921 A | 2/1986 | King | 141/5 |
| 4,667,517 A | 5/1987 | Holden | 73/743 |
| 4,763,516 A | 8/1988 | Greenspan | 73/146.8 |
| 5,481,921 A | 1/1996 | Carpenter et al. | 73/743 |
| 5,581,029 A | 12/1996 | Wahl et al. | 73/741 |
| 5,587,226 A * | 12/1996 | Leung et al. | 428/410 |
| 5,656,772 A | 8/1997 | Markel | 73/146.8 |
| 5,834,651 A | 11/1998 | McSheffrey et al. | 73/743 |
| 5,895,861 A | 4/1999 | Slonaker | 73/732 |
| 5,983,726 A | 11/1999 | Heller | 73/706 |
| 6,026,854 A | 2/2000 | Davidson | 137/547 |
| 6,082,396 A | 7/2000 | Davidson | 137/505.25 |
| 6,216,541 B1 | 4/2001 | Carpenter | 73/741 |

* cited by examiner

Primary Examiner—Charles H. Nolan, Jr.
Assistant Examiner—Marissa Ferguson
(74) Attorney, Agent, or Firm—Testa, Hurwitz & Thibeault, LLP

(57) ABSTRACT

The pressure gauge spring is a responsive and easy to manufacture gauge for connection to a pressure source. The spring assembly comprises a coiled hollow tube having a first end and a second end with a body portion therebetween, the hollow tube adapted to produce a displacement of the second end in response to a change in said pressure source to which said first end is connected. The second end of the body portion is sealed. The body portion of the spring assembly has a first longitudinal portion and a second longitudinal portion extending from proximate to said first longitudinal portion to said second end and substantially uniformly compressed along the second longitudinal portion to reduce volume thereby. A transition area is disposed between said first end and said first longitudinal portion of said hollow tube, and is compressed so as to form a continuous longitudinally extending ridge along said transition area.

11 Claims, 3 Drawing Sheets

PRESSURE GAUGE SPRING

FIELD OF THE INVENTION

The invention relates generally to pressure gauges and more particularly to bourdon tube pressure gauges.

BACKGROUND OF THE INVENTION

Spring gauges for use in measuring pressure or temperature are well known and have been used commercially for many years. In the case of a Bourdon tube gauge, the measurement element is a tube sealed at a first end and attached to a pressure source to be measured at a second end. U.S. Pat. No. 4,667,517 discloses a Bourdon tube spring element for measuring pressure. Generally, such gauges offer a multitude of uses including applications in the fire protection, medical component, and acetylene welding industries. The spring element is made by compressing through cold working only predetermined areas of a tube wall resulting in a relatively less compressed ridge extending along the length of the tube. This ridge facilitates rapid communication of changes in the pressure source along the length of the tube. Accordingly, response time of the gauge is improved. Unfortunately, the spring gauge requires careful cold working along the entire length of the tube by compression to form the ridge and fails to minimize the volume within the tube and the materials required to produce it.

SUMMARY OF THE INVENTION

The invention provides a bourdon tube gauge for measurement of pressure with improved responsiveness to pressure fluctuations, ease of manufacture, and reduced material requirements as compared to conventional pressure gauges. The pressure gauge of the invention includes a spring assembly for connection to a pressure source including a coiled hollow tube having a first end and a second end with a body portion therebetween. The hollow tube is adapted to produce a displacement of the second end in response to a change in the pressure source to which the first end is connected. The second end of the body portion is sealed. The body portion of the spring assembly has a first longitudinal portion and a second longitudinal portion extending from proximate to the first longitudinal portion to the second end. The body portion is substantially uniformly compressed along the second longitudinal portion to thereby reduce the volume of the body portion.

In one embodiment, a transition area is disposed between the first end and the first longitudinal portion of the hollow tube. The transition area is compressed in a manner so as to form a continuous longitudinally extending ridge along said transition area. In another embodiment, the second longitudinal portion is substantially uniformly compressed to form a uniform thickness along the length thereof. The first longitudinal portion and the transition area are partially compressed so as to form a ridge extending along the length of the transition area and the first longitudinal portion.

DESCRIPTION OF ILLUSTRATIVE EMBODIMENTS

Figure 2A:
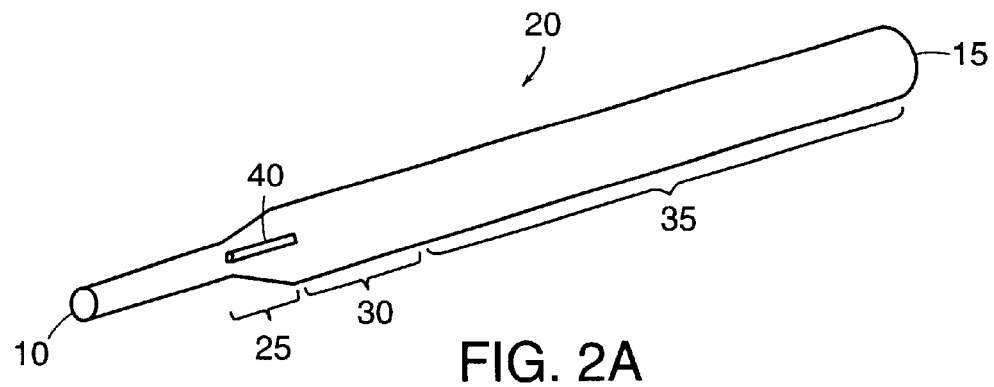
FIG. 2A is a perspective view of a spring element constructed in accordance with the invention in the extended configuration.
Figure 2B:
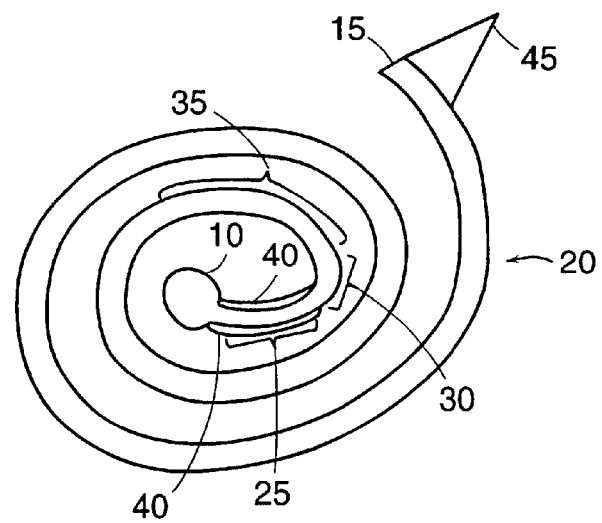
FIG. 2B is a perspective view of the spring element of FIG. 2A in a coiled configuration.

FIGS. 1, 1A, 1B, 1C and FIGS. 2A, 2B, depict a spring assembly for a pressure gauge comprising a hollow tube having a first end 10, a second end 15 and a body portion 20 therebetween. When in use in the pressure gauge, the tube is coiled from first end 10 to second end 15. The body portion is compressed to form a transition area 25 disposed proximate to first end 10, a first longitudinal portion 30, and a second longitudinal portion 35. In one embodiment, the length of the first longitudinal portion 30 is 5 to 10 percent of the length of the second longitudinal portion 35. The first longitudinal portion 30 extends from the transitional area 25 to the second longitudinal portion 35. The second longitudinal portion 35 extends from the first longitudinal portion 30 to the second end 15 of the body portion 20. First end 10 of body portion 20 is adapted for mounting to a pressure source and second end 15 of body portion is fitted with an indicator pointer 45 as shown in FIG. 2B.

Figure 1:
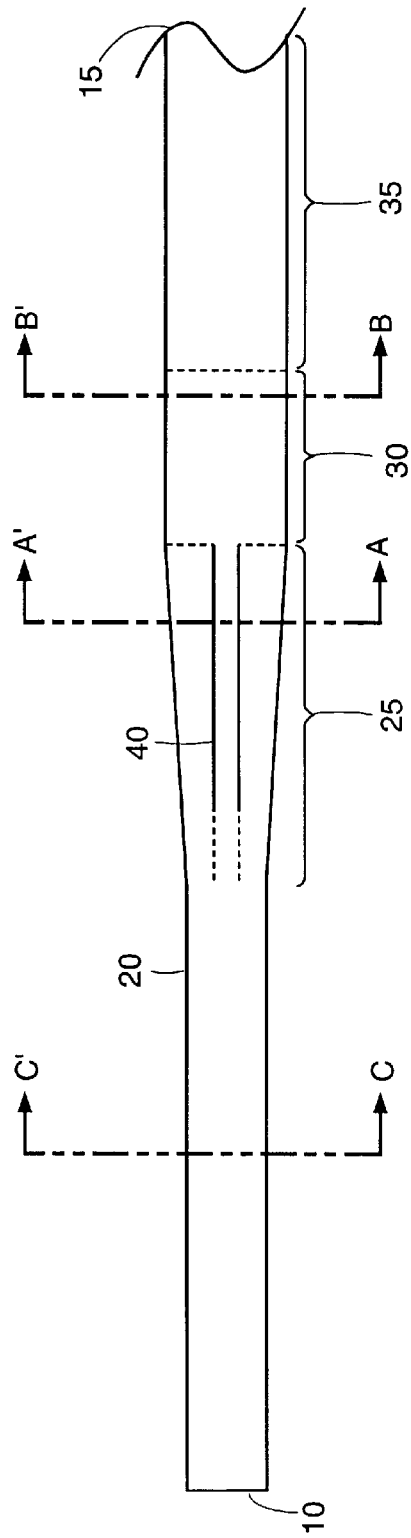
FIG. 1 is an enlarged plan-view of a spring element according to the invention.
Figure 1C:
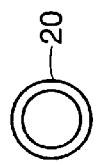
FIG. 1C is a cross-sectional view through line C-C' in FIG. 1.
Figure 1B:
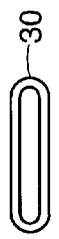
FIG. 1B is a cross-sectional view through line B-B' in FIG. 1.
Figure 1A:
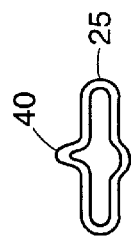
FIG. 1A is a cross-sectional view through line A-A' in FIG. 1.
Figure 1D:
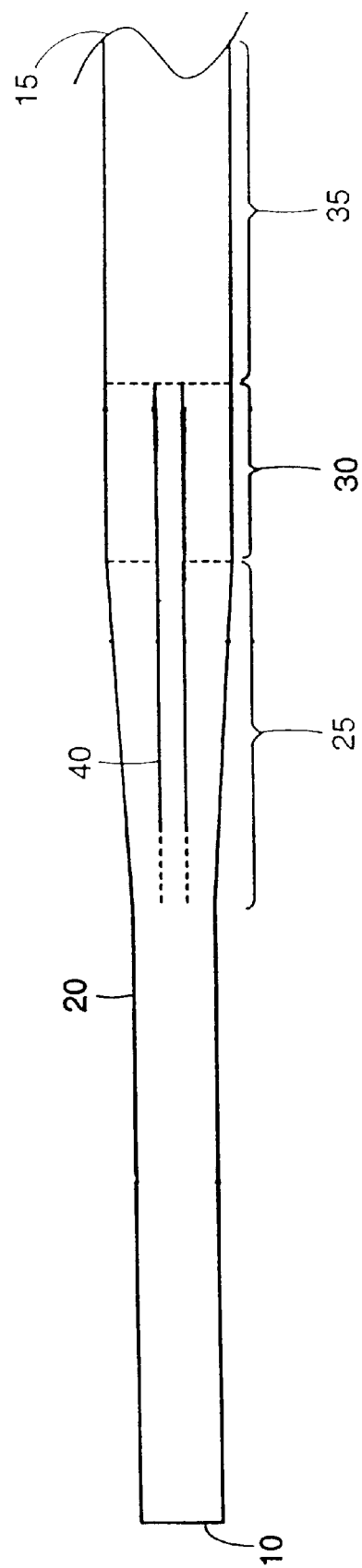
FIG. 1D is an enlarged plan view of another embodiment of the invention.

With continued referenced to FIGS. 1, 1A, 1B, 1C, first longitudinal portion 30 (FIG. 1B) and second longitudinal portion 35 are substantially uniformly compressed to form a uniform thickness along the length of first and second longitudinal portions 30, 35 and the transitional area 25 (FIG. 1A) is partially compressed so as to form a ridge 40 (FIG. 1A) in one embodiment of the invention. In another embodiment shown in FIG. 1D, second longitudinal portion 35 is substantially uniformly compressed so as to form a uniform thickness along the length of second longitudinal portion 35. Both the first longitudinal portion 30 and the transition area 25 are partially compressed so as to form a ridge 40 extending along the length of the first longitudinal portion 30 and the transition area 25.

In one embodiment, body portion 20 comprises a thin-walled steel tube longitudinally coiled into a spiral. In other embodiments, body portion 20 comprises a thin-walled steel tube longitudinally coiled into a planar helix.

In operation pressure from the source being measured is applied to the first end 10 and causes the fluid (such as, for example, air) to expand into the first longitudinal portion 30 and the second longitudinal portion 35. The pressure of the fluid causes the tube in the coiled configuration (see FIG. 2B) to uncoil as a known function of the applied pressure at the first end 10. As more pressure is applied, the more the coil uncoils, thereby causing the indicator 45 to move to a different location on a calibrated dial. The ridge 40 permits the fluid to enter the longitudinal portions 30, 35 more uniformly and rapidly.

With renewed referenced to FIG. 2B, the spring assembly is manufactured by first bending the body portion 20 of the tube at the transitional area 25 to form a substantially right angle with longitudinal portions 30, 35. The remainder of the spring assembly, from the transition area 25 to the second end 15 is substantially flatten by using known metal working methods, for example, by feeding the body portion 20 between two opposing compression wheels. If compression wheels are used for manufacturing the spring assembly, an arc portion with a length matching the ridge 40 is recessed along the circumference of both of the wheels to substantially reduce the compression of the body portion 20 along the transition area 25 as the body portion 20 feeds between the wheels and so as to form the ridge 40 along the transition area 25. The remaining areas of the wheels are substantially uniform and accordingly, the first longitudinal portion 30 and the second longitudinal portion 35 are substantially uniformly compressed.

In one embodiment the spring assembly, prior to coiling, is heat treated at temperature between 600 and 800 degrees Fahrenheit for between 1 and 3 hours to improve tensile strength and gauge responsiveness. In a further embodiment or in combination with the aforementioned embodiment, the spring assembly is processed in an acid wash solution wherein the acid wash solution comprises 25 percent phosphoric acid, 75 percent water, and a brass plate for 30 to 60 minutes.

The invention may be embodied in other specific forms without departing form the spirit or essential characteristics thereof. The foregoing embodiments are therefore considered in all respects illustrative rather than limiting of the invention described herein. Scope of the invention is thus indicated by the appended claims rather than by the foregoing description, and all changes which come within the meaning and range of equivalency of the claims are therefore intended to be embraced herein.

What is claimed is:

1. A spring assembly for a pressure gauge for connection to a pressure source, the spring assembly comprising:

a coiled hollow tube having a first end and a second end with a body portion therebetween, the hollow tube adapted to produce a displacement of the second end in response to a change in the pressure source to which the first end is connected;

the body portion having a substantially cylindrical portion extending from proximate the first end, a first longitudinal portion, and a second longitudinal portion extending from proximate the first longitudinal portion to the second end, the second longitudinal portion substantially uniformly compressed to reduce volume thereby;

a transition area defined by the region between the substantially cylindrical portion and the first longitudinal portion of the hollow tube, the transition area being compressed so as to form a continuous longitudinally extending ridge along the transition area; and wherein the second end of the body portion is sealed.

2. The spring assembly according to claim 1, wherein the continuous longitudinally extending ridge extends into the first longitudinal portion.

3. The spring according to claim 1, wherein the first longitudinal portion of the body portion is compressed so as to form a continuous longitudinally extending ridge along the first longitudinal portion.

4. The spring assembly according to claim 1 further comprising an indicator pointer attached to said second end of said body portion.

5. The spring assembly according to claim 1 further comprising a calibrated pressure gauge.

6. The spring assembly according to claim 5 wherein said acid wash comprises 25 percent phosphoric acid and 75 percent water.

7. The spring assembly according to claim 6 wherein said spring assembly is heat treated at temperature between 600 and 800 degrees Fahrenheit for a time between 1 and 3 hours.

8. The spring assembly according to claim 1 wherein said spring assembly is treated with an acid wash.

9. The spring assembly according to claim 1 wherein said spring assembly is heat treated.

10. A spring assembly for a pressure gauge for connection to a pressure source, the spring assembly comprising:

a coiled hollow tube having a first end and a second end with a body portion therebetween, the hollow tube adapted to produce a displacement of the second end in response to a change in the pressure source to which the first end is connected;

the body portion having a substantially cylindrical portion extending from proximate the first end, a first longitudinal portion, and a second longitudinal portion extending from proximate the first longitudinal portion to the second end, wherein the region between the cylindrical portion and the first longitudinal portion is compressed to form a continuous longitudinally extending ridge, and the second longitudinal portion substantially uniformly compressed to reduce volume thereby;

wherein the second end of the body portion is sealed.

11. The spring assembly according to claim 10, wherein the first longitudinal portion of the body portion is compressed so as to form a continuous longitudinally extending ridge along the first longitudinal portion.

* * * * *

UNITED STATES PATENT AND TRADEMARK OFFICE
CERTIFICATE OF CORRECTION

PATENT NO. : 6,758,097 B2
DATED : July 6, 2004
INVENTOR(S) : McSheffrey

It is certified that error appears in the above-identified patent and that said Letters Patent is hereby corrected as shown below:

Column 4,
Line 4, cancel the text beginning with "3. The spring according to claim 1" and ending "longitudinal portion" and insert the following claim:
-- 3. The spring assembly according to claim 1 wherein said hollow tube is stainless steel. --
Line 14, cancel the text beginning with "6. The spring assembly according to claim 5" and ending "percent water" and insert the following claim:
-- 6. The spring assembly according to claim 1 wherein said spring assembly is treated with an acid wash. --
Line 17, cancel the text beginning with "7. The spring assembly according to claim 6" and ending "1 and 3 hours" and insert the following claim:
-- 7. The spring assembly according to claim 1 wherein said spring assembly is heat treated. --
Line 21, cancel the text beginning with "8. The spring assembly according to claim 1" and ending "with an acid wash" and insert the following claim:
-- 8. The spring assembly according to claim 6 wherein said acid wash comprises 25 percent phosphoric acid and 75 percent water. --
Line 23, cancel the text beginning with "9. The spring assembly according to claim 1" and ending "is heat treated" and insert the following claim:
-- 9. The spring assembly according to claim 7 wherein said spring assembly is heat treated at temperature between 600 and 800 degrees Fahrenheit for a time between 1 and 3 hours. --

Signed and Sealed this

First Day of March, 2005

JON W. DUDAS
*Director of the United States Patent and Trademark Office*